United States Patent
Merry (10) Patent No.: US 9,494,071 B2
(45) Date of Patent: Nov. 15, 2016

(54) MOUNTING MAT FOR MOUNTING MONOLITH IN A POLLUTION CONTROL DEVICE

(75) Inventor: Richard P. Merry, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 826 days.

(21) Appl. No.: 10/561,290

(22) PCT Filed: Jun. 30, 2004

(86) PCT No.: PCT/US2004/020953
§ 371 (c)(1),
(2), (4) Date: Dec. 20, 2005

(87) PCT Pub. No.: WO2005/000466
PCT Pub. Date: Jan. 6, 2005

(65) Prior Publication Data
US 2006/0154040 A1    Jul. 13, 2006

(30) Foreign Application Priority Data
Jun. 30, 2003    (EP) .................................. 03101941

(51) Int. Cl.
*B01D 53/34* (2006.01)
*F01N 3/28* (2006.01)
(Continued)

(52) U.S. Cl.
CPC ............... *F01N 3/2864* (2013.01); *B32B 5/02* (2013.01); *B32B 5/06* (2013.01); *B32B 5/26* (2013.01); *D04H 1/413* (2013.01); *D04H 1/4209* (2013.01);
(Continued)

(58) Field of Classification Search
USPC .................... 422/179; 428/77, 292.1; 29/890
See application file for complete search history.

(56) References Cited

U.S. PATENT DOCUMENTS

| 3,001,571 A | 9/1961 | Hatch |
| 3,709,706 A | 1/1973 | Sowman |

(Continued)

FOREIGN PATENT DOCUMENTS

| EP | 0 396 331 A1 | 11/1990 |
| EP | 0 579 956 A1 | 1/1994 |

(Continued)

OTHER PUBLICATIONS

Howitt et al., "Flow Effects in Monolithic Honeycomb Automotive Catalytic Converters," Paper No. 740244, SAE Technical Paper Series, 1974.

(Continued)

*Primary Examiner* — Gwendolyn Blackwell
*Assistant Examiner* — Anthony J Frost (57) ABSTRACT

The present invention provides a multilayer mounting mat for mounting a pollution control element. The mounting mat comprises a layer of intumescent material between two non-intumescent layers defining opposite major sides of the mounting mat. The mounting mat in accordance with the present invention is suitable for mounting a pollution control element in a pollution control device and is in particular suitable for mounting fragile monolith such as thin-wall and ultra thin-wall monoliths. Also, the mounting mats conveniently exhibit a good or excellent holding pressure over a wide temperature range and can be formulated in an inexpensive way. The invention also provides a pollution control device comprising a pollution control element arranged in a casing with the mounting mat disposed between the casing and pollution control element.

18 Claims, 1 Drawing Sheet

(51) Int. Cl.
  *B32B 5/02* (2006.01)
  *B32B 5/06* (2006.01)
  *B32B 5/26* (2006.01)
  *D04H 1/413* (2012.01)
  *D04H 1/4209* (2012.01)
  *D04H 1/4374* (2012.01)
  *D04H 1/593* (2012.01)

(52) U.S. Cl.
  CPC ............ *D04H 1/4374* (2013.01); *D04H 1/593* (2013.01); *F01N 3/2857* (2013.01); *B32B 2250/03* (2013.01); *B32B 2250/20* (2013.01); *B32B 2250/40* (2013.01); *B32B 2262/10* (2013.01); *B32B 2262/101* (2013.01); *B32B 2262/105* (2013.01); *B32B 2605/00* (2013.01); *F01N 2330/10* (2013.01); *F01N 2330/101* (2013.01); *F01N 2330/18* (2013.01); *F01N 2330/48* (2013.01); *Y10T 428/249924* (2015.04)

(56) References Cited

U.S. PATENT DOCUMENTS

| | | | |
|---|---|---|---|
| 3,760,049 | A | 9/1973 | Borer et al. |
| 3,916,057 | A | 10/1975 | Hatch et al. |
| 4,181,514 | A | 1/1980 | Lefkowitz et al. |
| 4,305,992 | A | 12/1981 | Langer et al. |
| 4,385,135 | A | 5/1983 | Langer et al. |
| 4,929,429 | A | 5/1990 | Merry |
| 4,999,168 | A * | 3/1991 | Ten Eyck ............ 422/179 |
| 5,028,397 | A | 7/1991 | Merry |
| 5,207,989 | A | 5/1993 | MacNeil |
| 5,242,871 | A | 9/1993 | Hashimoto et al. |
| 5,250,269 | A | 10/1993 | Langer |
| 5,254,410 | A | 10/1993 | Langer et al. |
| 5,290,522 | A * | 3/1994 | Rogers et al. ............ 422/179 |
| 5,385,873 | A | 1/1995 | MacNeill |
| 6,365,267 | B1 * | 4/2002 | Langer et al. ............ 428/324 |
| 6,460,320 | B2 | 10/2002 | Schierz et al. |
| 6,737,146 | B2 | 5/2004 | Schierz et al. |

FOREIGN PATENT DOCUMENTS

| | | |
|---|---|---|
| EP | 0 884 459 A2 | 12/1998 |
| EP | 0 884 459 A3 | 12/1998 |
| EP | 1 314 866 A2 | 5/2003 |
| EP | 1 495 807 A1 | 1/2005 |
| GB | 1 522 646 | 8/1978 |
| JP | 56-85012 | 7/1981 |
| JP | 2061313 | 3/1990 |
| JP | 2-43786 | 10/1990 |
| JP | 7-91124 | 4/1995 |
| JP | 7286514 | 10/1995 |
| JP | 10-288032 | 10/1998 |
| JP | 2002-47070 A | 7/2000 |
| WO | WO 99/46028 | 9/1999 |
| WO | WO 00/11098 | 3/2000 |
| WO | WO 03/031368 A2 | 4/2003 |
| WO | WO 2004/031544 A2 | 4/2004 |

OTHER PUBLICATIONS

Howitt, "Thin Wall Ceramics as Monolithic Catalyst Supports," Paper No. 800082, SAE Technical Paper Series, 1980.

Stroom et al., "Systems Approach to Packaging Design for Automotive Catalytic Converters," Paper No. 900500, SAE Technical Paper Series, 1990.

Umehara et al., "Advanced Ceramic Substrate: Catalytic Performance Improvement by High Geometric Surface Area and Low Heat Capacity," Paper No. 971029, SAE Technical Paper Series, 1997.

Umehara et al., "Design Development of High Temperature Manifold Converter Using Thin Wall Ceramic Substrate," Paper No. 971030, SAE Technical Paper, p. 123-129, 1997.

* cited by examiner

MOUNTING MAT FOR MOUNTING MONOLITH IN A POLLUTION CONTROL DEVICE

FIELD OF THE INVENTION

The present invention relates to a mounting mat for mounting a pollution control monolith in a pollution control device. In particular the present invention relates to a mounting mat that comprises an intumescent layer between two non-intumescent layers, with each non-intumescent layer comprising inorganic fibers. The invention further relates to a pollution control device.

BACKGROUND OF THE INVENTION

Pollution control devices are employed on motor vehicles to control atmospheric pollution. Such devices include a pollution control element. Exemplary pollution control devices include catalytic converters and diesel particulate filters or traps. Catalytic converters typically contain a ceramic monolithic structure having walls that support the catalyst. The catalyst typically oxidizes carbon monoxide and hydrocarbons, and reduces the oxides of nitrogen in engine exhaust gases to control atmospheric pollution. The monolithic structure may also be made of metal. Diesel particulate filters or traps typically include wall flow filters that are often honeycombed monolithic structures made, for example, from porous ceramic materials. The filters typically remove soot and other exhaust particulate from the engine exhaust gases. Each of these devices has a housing (typically made of a metal like stainless steel) that holds the pollution control element.

Monolithic pollution control elements, are often described by their wall thickness and the number of openings or cells per square inch (cpsi). In the early 1970s, ceramic monolithic pollution control elements with a wall thickness of 12 mils and a cell density of 300 cpsi were common ("12/300 monoliths"). As emission laws become more stringent, wall thicknesses have decreased as a way of increasing geometric surface area, decreasing heat capacity and decreasing pressure drop of the monolith. The standard has progressed to 6/400 monoliths.

With their thin walls, ceramic monolithic structures are fragile and susceptible to vibration or shock damage and breakage. The damaging forces may come from rough handling or dropping during the assembly of the pollution control device, from engine vibration or from travel over rough roads. The ceramic monoliths are also subject to damage due to high thermal shock, such as from contact with road spray.

The ceramic monoliths have a coefficient of thermal expansion generally an order of magnitude less than the metal housing which contains them. For instance, the gap between the peripheral wall of the metal housing and the monolith may start at about 4 mm, and may increase a total of about 0.33 mm as the engine heats the catalytic converter monolithic element from 25° C. to a maximum operating temperature of about 900° C. At the same time, the metallic housing increases from a temperature of about 25° C. to about 530° C. Even though the metallic housing undergoes a smaller temperature change, the higher coefficient of thermal expansion of the metallic housing causes the housing to expand to a larger peripheral size faster than the expansion of the monolithic element. Such thermal cycling typically occurs hundreds or thousands of times during the life of the vehicle.

To avoid damage to the ceramic monoliths from road shock and vibrations, to compensate for the thermal expansion difference, and to prevent exhaust gases from passing between the monoliths and the metal housings (thereby bypassing the catalyst), mounting mats or mounting paste materials are disposed between the ceramic monoliths and the metal housings. The process of placing the monolith within the housing is also called canning and includes such steps as wrapping a sheet of mat material around the monolith, inserting the wrapped monolith into the housing, pressing the housing closed, and welding flanges along the lateral edges of the housing. The paste may be injected into the gap between the monolith and the metal housing, perhaps as a step in the canning process.

Typically, the paste or sheet mounting materials include inorganic binders, inorganic fibers, intumescent materials, organic binders, fillers and other adjuvants. The materials may be used as sheets, mats, or pastes. Known mat materials, pastes, and intumescent sheet materials used for mounting a monolith in a housing are described in, for example, U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 5,242,871 (Hashimoto et al.), U.S. Pat. No. 3,001,571 (Hatch), U.S. Pat. No. 5,385,873 (MacNeil), U.S. Pat. No. 5,207,989 (MacNeil), GB 1,522,646 (Wood), Japanese Kokai No.: J.P. Sho. 58-13683 (i.e., Pat Appln Publn No. J.P. Hei. 2-43786 and Appln No. J.P. Sho. 56-112413), and Japanese Kokai No.: J.P. Sho. 56-85012 (i.e., Pat. Appln No. Sho. 54-168541). Mounting materials should remain very resilient at a full range of operating temperatures over a prolonged period of use.

To continually improve emission standards, it has been desired to move catalytic converters closer to the engine and thereby increase the temperature of the exhaust gasses traveling through the catalytic converter. The hotter catalytic converter and exhaust gasses therein increase the efficiency of the reactions, which remove pollution from the exhaust gasses. As hotter catalytic converter temperatures are used, the mounting materials must be able to withstand the severe temperatures. In addition, the thermal transmission properties of the mounting material become more important toward protecting closely mounted engine components from the hot exhaust temperatures. Decreasing the converter skin temperature is important in preventing heat damage in the engine compartment and radiation into the passenger compartment.

It has also been desired to continually decrease wall thicknesses of the ceramic monolithic structure to enhance catalytic converter operation. Extremely thin wall monoliths, such as 4/400, 4/600, 3/600, 3/900, 2/900 monoliths, and 2/1200 have been developed or are expected to be developed in the not too distant future. The monoliths with extremely thin walls are even more delicate and susceptible to breakage. Typical intumescent mounting structures provide compression pressures which increase during use of the catalytic converter to a pressure above the initial mounting pressure. Increasing compression pressures during use of the catalytic converter also reduce the ability of support mats or pastes to sufficiently insulate the monolith from vibration damage or mechanical shock. Because of these various problems, published reports have advised against using intumescent mounting mats for extremely thin wall monoliths mounted close to the engine. See for example Umehara et al., "Design Development of High Temperature Manifold Converter Using Thin Wall Ceramic Substrate", SAE paper no. 971030, pg. 123-129, 1997.

A need exists for a mounting system which is sufficiently resilient and compressible to accommodate the changing gap between the monolith and the metal housing over a wide range of operating temperatures and a large number of thermal cycles. While the state of the art mounting materials have their own utilities and advantages, there remains an ongoing need to improve mounting materials for use in pollution control devices. Additionally, one of the primary concerns in forming the mounting mat is balancing between the cost of the materials and performance attributes. It is desirable to provide such a high quality mounting system at the lowest possible cost. Because of increasing environmental concerns, the mounting mat is preferably also more environmentally friendly.

SUMMARY OF THE INVENTION

In one aspect, the present invention provides a multilayer mounting mat for mounting a pollution control element, the mounting mat comprises a layer of intumescent material between two non-intumescent layers defining opposite major sides of the mounting mat. Each non-intumescent layer, and preferably the intumescent layer, comprises inorganic fibers.

The mounting mat in accordance with the present invention is suitable for mounting a pollution control element in a pollution control device and is in particular suitable for mounting a fragile monolithic element such as thin-wall and ultra thin-wall monoliths. Also, the mounting mats conveniently exhibit a good or excellent holding pressure over a wide temperature range and can be formulated in an inexpensive way.

In a further aspect, the invention therefore provides a pollution control device comprising a pollution control element arranged in a casing or housing with the mounting mat disposed between the casing and pollution control element.

As used herein, "intumescent material" means a material that expands, foams, or swells when exposed to a sufficient amount of thermal energy.

As used herein, "intumescent layer" means a layer of the mat that contains an intumescent material.

As used herein, "non-intumescent layer" means a layer of the mat that does not contain any intumescent material or at least not enough of an intumescent material to contribute a significant amount to the holding pressure exerted by the mounting mat.

BRIEF DESCRIPTION OF THE DRAWINGS

Solely for the purpose of illustration and better understanding of the invention and without the intention to limit the invention in any way thereto, the following drawings are provided.

DETAILED DESCRIPTION OF THE INVENTION

Figure 1:
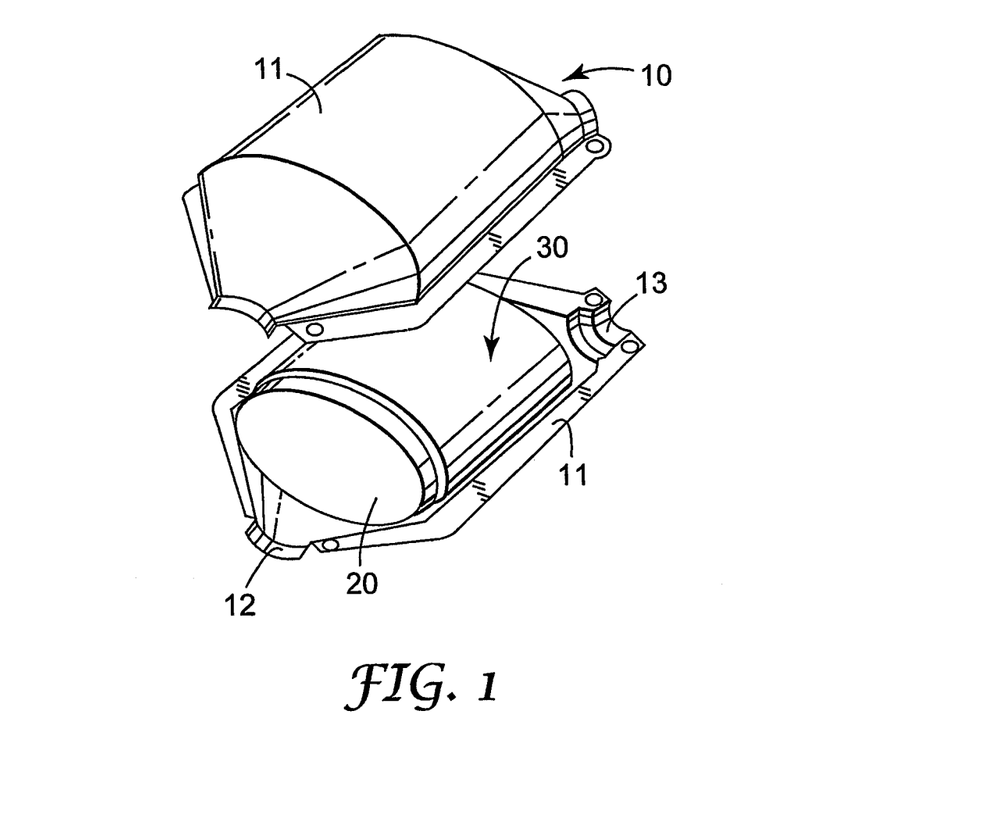
FIG. 1 is a perspective view of a catalytic converter of the present invention shown in disassembled relation.

Referring to FIG. 1 pollution control device 10 comprises a casing 11, preferably made of a metal material, with generally frusto-conical inlet and outlet ends 12 and 13, respectively. Disposed within casing 11 is a pollution control element or monolith 20. Surrounding pollution control monolith 20 is mounting mat 30 according to the invention and which serves to tightly but resiliently support monolithic element 20 within the casing 11. Mounting mat 30 holds pollution control monolith 20 in place in the casing and seals the gap between the pollution control monolith 20 and casing 11 to thus prevent or minimize exhaust gases from by-passing pollution control monolith 20. As can be seen from FIG. 1, the exterior of casing 11 is exposed to the atmosphere. In other words, the device 10 does not including another housing in which the casing 11 is housed.

The casing can be made from materials known in the art for such use including stainless steel, etc.

Pollution control elements that can be mounted with the mounting mat of the invention include gasoline pollution control monoliths as well as diesel pollution control monoliths. The pollution control monolith may be a catalytic converter, a particulate filter or trap, or the like. Catalytic converters contain a catalyst, which is typically coated on a monolithic structure mounted within a metallic housing. The catalyst is typically adapted to be operative and effective at the requisite temperature. For example for use with a gasoline engine the catalytic converter should be effective at a temperature of 400° C. to 950° C. whereas for a diesel engine lower temperatures, typically not more than 350° C. are common. The monolithic structures are typically ceramic, although metal monoliths have also been used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter", most diesel engines are equipped with only a diesel oxidation catalytic converter. Catalytic converters for reducing the oxides of nitrogen, which are only in limited use today for diesel engines, generally consist of a separate catalytic converter. Examples of pollution control monoliths for use with a gasoline engine include those made of cordierite that are commercially available from Corning Inc. (Corning, N.Y.) or NGK Insulators, LTD. (Nagoya, Japan) or metal monoliths commercially available from Emitec (Lohmar, Germany).

For additional details regarding catalytic monoliths see, for example, "Advanced Ceramic Substrate: Catalytic Performance Improvement by High Geometric Surface Area and Low Heat Capacity," Umehara et al., Paper No. 971029, SAE Technical Paper Series, 1997; "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable Diesel particulate filters made of cordierite are commercially available from Corning Inc. (Corning N.Y.) and NGK Insulators Inc. (Nagoya, Japan). Diesel particulate filters made of Silicon Carbide are commercially available from Ibiden Co. Ltd. (Japan) and are described in, for example, JP 2002047070A.

The mounting mat of the present invention can be used to mount so-called thin wall or ultra-thin wall pollution control monoliths. In particular, the mounting mat can be used to mount pollution control monoliths that have from 400 to 1200 cpsi and that have wall thickness of not more than 0.005 inch (0.127 mm). Examples of pollution control monoliths that may be mounted with the mounting mat include thin wall monoliths 4 mil/400 cpsi and 4 mil/600 cpsi and ultra-thinwall monoliths 3 mil/600 cpsi, 2 mil/900 cpsi and 2 mil/1200 cpsi.

Figure 2:
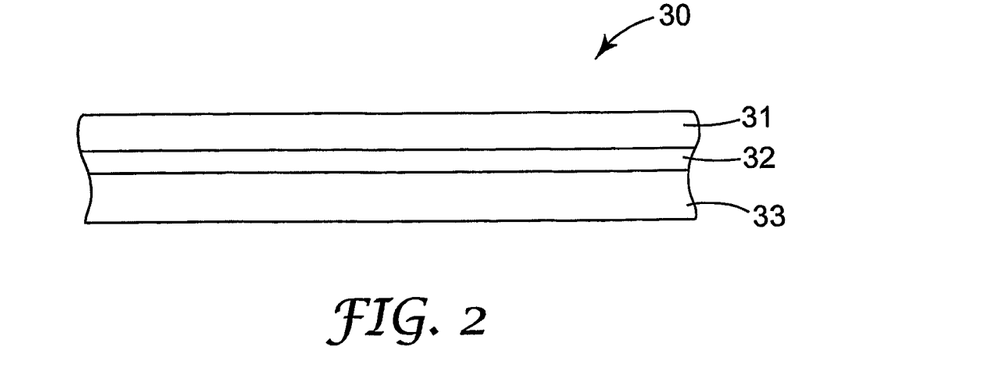
FIG. 2 schematically shows a cross-section of a mounting mat according to the invention.

FIG. 2 shows a schematic drawing of a cross-section of a mounting mat in connection with the present invention. Mounting mat 30 comprises non-intumescent layers 31 and 33 in-between which is located an intumescent layer 32. Each of the layers 31 and 33 comprises inorganic fiber. The non-intumescent layers 31 and 33 define the opposite major sides of the mounting mat as the layers 31, 32 and 33 are stacked on top of each other. In one embodiment of a pollution control device according to the present invention, the mat 30 is disposed around the element 20 such that the non-intumescent layer 31 is disposed between the intumescent layer 32 and the casing 11 and the non-intumescent layer 33 is disposed between the intumescent layer 32 and the element 20. The overall mounting mat typically will have a bulk density in the range of from about 0.15 to about 0.50 g/cm$^3$, preferably in the range of from about 0.20 to about 0.40 g/cm$^3$. When mounted, the mat is substantially compressed to a mounting density typically in the range of from about 0.3 to about 1.0 g/cm$^3$.

Although FIG. 2 shows a mounting mat with only three layers, additional layers may be present. For example, additional non-intumescent and/or intumescent layers may be included. However, when additional intumescent layers are provided, these should generally not be provided as outer layers of the mat. For example, multiple layers of intumescent layers are typically provided between two non-intumescent layers not excluding however an embodiment where two adjacent contiguous layers of intumescent material are sandwiched between two non-intumescent layers.

Also, the mounting mat may comprise more than two non-intumescent layers. For example, on either side of the intumescent layer additional non-intumescent layers of differing physical or chemical fiber composition may be provided. Still further, between additional non-intumescent layers may be provided additional intumescent layers. Still further optional layers can include, for example, coatings, scrims, or films aimed at reducing possible skin irritation from the fibers.

Thus, each of the non-intumescent layers 31 and 33 can be constructed using one or multiple layers of non-intumescent material, and the intumescent layer 32 can be constructed using one or multiple layers of intumescent material. Preferably, the non-intumescent layer(s) 33 insulates, so as to protect, the intumescent layer(s) 32 from excessive heat (i.e., heat that could significantly damage the desired properties of the layer(s) 32) from the element 20, e.g., during the operation or testing of the device 10. At the same time, it is also preferable for the non-intumescent layer(s) 31 to insulate the intumescent layer(s) 32 from the relatively lower temperature of the casing 11 (i.e., the temperature of the surrounding air) such that the intumescent layer(s) 32 is able to reach and sufficiently maintain its desired operating temperature (i.e., the layer(s) 32 will expand sufficiently to apply the pressure desired). In an effort to facilitate this relationship between the various layers 31, 32 and 33, it has been found desirable for each non-intumescent layer(s) 31 and 33 to exhibit a surface density (sometimes referred to as the basis weight) of greater than or equal to about 450 g/m$^2$ and for the intumescent layer(s) to exhibit a surface density of greater than or equal to about 500 g/m$^2$. It can be desirable to use such a mat design when the element 20 being mounted reaches temperatures of at least 550° C. Depending on the temperatures reached by the particular element 20, it can also be desirable for the surface density of the non-intumescent layer 31 and the non-intumescent layer 33 to be greater than or equal to about 600 g/m$^2$, greater than or equal to about 800 g/m$^2$, greater than or equal to about 1000 g/m$^2$ or even greater than or equal to about 1400 g/m$^2$. It can also be desirable for the surface density of the intumescent layer 32 to be greater than or equal to about 1000 g/m$^2$, greater than or equal to about 1500 g/m$^2$ or even greater than or equal to about 2000 g/m$^2$. The stated surface densities apply for each layer 31, 32 and 33, regardless of whether each layer is of a single or multiple layer construction.

Catalytic converters typically used in the exhaust systems of gasoline powered internal combustion automobile engines are designed for an interface temperature, between the element 20 and the mat 30 (i.e., the layer 33) in the range of from about 750° C. to about 900° C. For long term durability, it is typically desirable to keep the intumescent layer(s) 32 at a temperature of less than or equal to about 700° C. For a number of catalytic converter designs, the layer(s) 32 can be kept at this temperature, when exposed to such an interface temperature range, by providing a non-intumescent layer(s) 33 having a compressed (i.e., installed or assembled) thickness of at least about 1 mm, between the element 20 and intumescent layer(s) 32. Depending on the specific non-intumescent layer(s) used, such a layer(s) 33 will generally have a surface density (i.e., weight per unit area) of greater than or equal to about 500 g/m$^2$. As the interface temperature gets higher, it is generally desirable for the layer(s) 33 to get thicker. For example, if the interface temperature (between element 20 and mat 30) is greater than or equal to about 1000° C., it may be desirable for the non-intumescent layer(s) 33 to have a mounted thickness of at least about 2 mm and a corresponding surface density of at least about 1000 g/m$^2$. As mentioned above, it is desirable for the intumescent layer(s) 32 to retain enough heat to that it expands so that it applies the desired pressure. In order to so retain sufficient heat for a number of catalytic converter applications, it can be desirable for the non-intumescent layer(s) 31 to have a thickness of at least 1 mm, after assembly. For applications where the element 20 exhibits lower than normal temperatures, it may be desirable for the non-intumescent layer(s) 31 to have a thickness of at least about 2 to 3 mm.

In order to avoid generating element holding pressures that exceed the crushing strength of the element, especially for thin walled or ultra-thin walled monolithic elements 20, the thickness of the intumescent layer(s) 32 is typically kept at least the same as, but preferably thinner than, the combined thickness of the non-intumescent layers 31 and 33 in the uncompressed state. Preferably, the uncompressed thickness of the intumescent layer is not more than about ⅓ of the thickness of the combined uncompressed thicknesses of the non-intumescent layers. Typically the thickness of each of the uncompressed layers is at least about 0.1 mm and generally not thicker than about 10 mm. The overall thickness of the uncompressed mat is typically at least about 3.0 mm and generally not thicker than about 30 mm.

The inorganic fibers of the non-intumescent layer may comprise any of the inorganic fibers known and/or used in mounting mats for mounting pollution control devices.

Useful inorganic fibers include for example, glass fibers, ceramic fibers, non-oxide inorganic fibers, such as graphite fibers or boron fibers, and mixtures thereof. Useful inorganic fibers may include, for example, those disclosed in PCT Publication No. WO 2004/031544 and U.S. Pat. Nos. 6,460,320 and 6,737,146, which are incorporated herein by reference in their entirety. Particularly useful are ceramic fibers that can be obtained from a so-called sol-gel process, which often are crystalline and are therefore also known as polycrystalline fibers, and glass fibers. As used herein, the term 'glass fiber' means a fiber consisting of glass and whereby the term glass means an inorganic product of fusion that has cooled to a rigid condition without substantially crystallizing. In a particular embodiment, the ceramic fibers of the non-intumescent layer may be annealed fibers. Also, preferably one of the non-intumescent layers will be essentially shot free, i.e. containing no shot at all or containing shot in an amount of not more than 5% by weight, preferably not more than 2% by weight of the total weight of the non-intumescent layer. A mounting mat comprising a polycrystalline, non-intumescent layer that is essentially shot free will preferably be oriented in the pollution control device such that the polycrystalline, non-intumescent layer that is essentially free of shot is adjacent the pollution control monolith as it has been found that maximum fiber resilience is desired close to monolith.

Preferred glass fibers for use as inorganic fibers in the non-intumescent layer include magnesium aluminium silicate glass fibers preferably having an average diameter of at least 5 μm and a length between 0.5 and 15 cm, preferably between 1 and 12 cm. More preferably, the average diameter will be at least 7 μm and is typically in the range of 7 to 14 μm. The fibers typically are shot free or contain a very low amount of shot, typically less than 1% by weight based on total weight of fibers. Additionally, the fibers are typically reasonably uniform in diameter, i.e. the amount of fibers having a diameter within ±3 μm of the average is generally at least 70% by weight, preferably at least 80% by weight and most preferably at least 90% by weight of the total weight of the magnesium aluminium silicate glass fibers.

Preferred magnesium aluminium silicate glass fibers comprise between 10 and 30% by weight of aluminium oxide, between 52 and 70% by weight of silicium oxide and between 1 and 12% of magnesium oxide. The weight percentage of the aforementioned oxides are based on the theoretical amount of $Al_2O_3$, $SiO_2$ and $MgO$. It will further be understood that the magnesium aluminium silicate glass fiber may contain additional oxides. For example, additional oxides that may be present include sodium or potassium oxides, boron oxide and calcium oxide. Particular examples of magnesium aluminium silicate glass fibers include E-glass fibers which typically have a composition of about 55% of $SiO_2$, 11% of $Al_2O_3$, 6% of $B_2O_3$, 18% of CaO, 5% of MgO and 5% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available for example from Advanced Glassfiber Yarns LLC and R-glass is available from Saint-Gobain Vetrotex.

Preferably, a non-intumescent glass fiber layer will be free or essentially free of fibers that have a diameter of 3 μm or less, more preferably the mat will be free or essentially free of fibers that have a diameter of less than 5 μm. Essentially free here means that the amount of such small diameter fibers is not more than 2% by weight, preferably not more than 1% by weight of the total weight of fibers in the glass fiber layer.

Preferred non-intumescent ceramic fiber layers comprise ceramic fibers that are obtained from a sol-gel process. By the term "sol-gel" process is meant that the fibers are formed by spinning or extruding a solution or dispersion or a generally viscous concentrate of the constituting components of the fibers or precursors thereof. The sol-gel process is thus to be contrasted with a process of melt forming fibers whereby the fibers are formed by extruding a melt of the components of the fibers. A suitable sol-gel process is for example disclosed in U.S. Pat. No. 3,760,049 wherein there is taught to form the ceramic fibers by extruding a solution or dispersion of metal compounds through orifices thereby forming continuous green fibers which are then fired to obtain the ceramic fibers. The metal compounds are typically metal compounds that are calcinable to metal oxides. Often the sol-gel formed fibers are crystalline or semicrystalline, which are known in the art as polycrystalline fibers.

Examples of solutions or dispersions of metal compounds to form fibers according to the sol-gel process include aqueous solutions of an oxygen-containing zirconium compounds, such as zirconium diacetate, containing colloidal silica, such as disclosed in U.S. Pat. No. 3,709,706. A further example includes an aqueous solution of water-soluble or dispersible aluminum and boron compounds, such as aqueous basic aluminum acetate, or a two-phase system comprising an aqueous mixture of a colloidal dispersion of silica and water-soluble or dispersible aluminum and boron compounds. Other representative refractory metal oxide fibers which can be made in through a sol-gel process include zirconia, zircon, zirconia-calcia, alumina, magnesium aluminate, aluminum silicate, and the like. Such fibers additionally can contain various metal oxides, such as iron oxide, chromia, and cobalt oxide.

Ceramic fibers which are useful in the mounting mat include polycrystalline oxide ceramic fibers such as mullites, alumina, high alumina aluminosilicates, aluminosilicates, zirconia, titania, chromium oxide and the like. Preferred fibers, which are typically high alumina, crystalline fibers, comprise aluminum oxide in the range from about 67 to about 98 percent by weight and silicon oxide in the range from about 33 to about 2 percent by weight. These fibers are commercially available, for example, under the trade designation "NEXTEL 550" from the 3M Company, SAFFIL™ available from Dyson Group PLC (Sheffield, UK), Maftec available from Mitsubishi Chemical Corp. (Tokyo, Japan), FIBERMAX™ from Unifrax, (Niagara Falls, N.Y.), and ALTRA fibers (Rath GmbH, Germany).

Suitable polycrystalline oxide ceramic fibers further include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least 50 percent by weight crystalline, more preferably, at least 75 percent, and most preferably, about 100% (i.e., crystalline fibers). Aluminoborosilicate fibers are commercially available, for example, under the trade designations "NEXTEL 312" and "NEXTEL 440" from the 3M Company.

The ceramic fibers obtainable through a sol-gel process are typically shot free or contain a very low amount of shot, typically less than 1% by weight based on total weight of the ceramic fibers. Also, the ceramic fibers will typically have an average diameter between 1 and 16 micrometers. In a preferred embodiment, the ceramic fibers have an average diameter of 5 µm or more and preferably the ceramic fibers are free or essentially free of fibers having a diameter of less than 3 µm, more preferably the ceramic fiber layer will be free or essentially free of fibers that have a diameter of less than 5 µm. Essentially free here means that the amount of such small diameter fibers is not more than 2% by weight, preferably not more than 1% by weight of the total weight of fibers in the ceramic fiber layer.

In a further aspect of the present invention, a non-intumescent layer of the mounting mat may comprise heat treated ceramic fibers sometimes called annealed ceramic fibers as the inorganic fibers. Annealed ceramic fibers may be obtained as disclosed in U.S. Pat. No. 5,250,269 or WO 99/46028. According to the teaching of these documents, annealed ceramic fibers may be obtained by annealing melt-formed refractory ceramic fibers at a temperature of at least 700° C. By annealing the ceramic fibers, fibers are obtained that have an increased resilience. Typically, a resilience value of at least 10 kPa may be obtained under the test conditions set out in U.S. Pat. No. 5,250,269. The melt-formed refractory ceramic fibers suitable for annealing, can be melt-blown or melt-spun from a variety of metal oxides, preferably a mixture of $Al_2O_3$ and $SiO_2$ having from 30 to 70% by weight of alumina and from 70 to 30% by weight of silica, preferably about equal parts by weight. The mixture can include other oxides such as $B_2O_3$, $P_2O_5$, and $ZrO_2$.

Suitable melt-formed refractory ceramic fibers are available from a number of commercial sources and include these known under the trade designation "Fiberfrax" from Carborundum Co., Niagara Falls, N.Y.; "Cerafiber" and "Kaowool" from Thermal Ceramics Co., Augusta, Ga.; "Cerwool" from Premier Refractories Co., Erwin, Tenn.; and "SNSC" from Shin-Nippon Steel Chemical of Tokyo, Japan. The manufacturer of ceramic fibers known under the trade designation "Cer-wool" states that they are melt-spun from a mixture of by weight 48% silica and 52% alumina and have an average fiber diameter of 34 micrometers. The manufacturer of ceramic fibers known under the trade designation "Cerafiber" states that they are meltspun from a mixture of by weight 54% silica and 46% alumina and have an average fiber diameter of 2.5-3.5 micrometers. The manufacturer of ceramic fibers "SNSC 1260-D1" states that they are melt-formed from a mixture of by weight 54% silica and 46% alumina and have an average fiber diameter of about 2 micrometers.

Other useful fibers include so-called soluble fibers i.e fibers that have in-vitro solubility. Suitable useful soluble ceramic fibers include Superwool 607 and Superwool 607 Max™ from Thermal Ceramics and Isofrax and Insulfrax ceramic fibers from Unifrax.

Useful intumescent materials for use in the intumescent layer include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™, insoluble sodium silicate, commercially available from 3M Company, St. Paul, Minn., and mixtures thereof For purposes of the present application, it is intended that each of the above-listed examples of intumescent materials are considered to be different and distinguishable from one another. Desired intumescent materials include unexpanded vermiculite ore, treated unexpanded vermiculite ore, expandable graphite, and mixtures thereof An example of a desirable commercially available expandable graphite material is GRAFOIL™. Grade 338-50 expandable graphite flake, from UCAR Carbon Co., Inc., Cleveland, Ohio.

The intumescent layer may comprise in addition to the intumescent material further materials such as for example inorganic fibers as described above for the non-intumescent layers. Thus, in a particular embodiment, the intumescent material may be distributed throughout a layer of inorganic fiber in the form of a thin commercially available intumescent mat made by a papermaking process. Alternatively, the intumescent layer may be formed by spraying or coating the intumescent material on one major side of a non-intumescent layer to which is than bonded or laminated a further non-intumescent layer using transfer adhesive, spray adhesive, or preferably heat activated web adhesive such as, for example PE 105-50 or PE 65-50 polyester web adhesive available from Bostik-Findley.

According to a method for making the mounting mat, in particular a non-woven mounting mat, chopped, individualized inorganic fibers are fed into a conventional web-forming machine (commercially available, for example, under the trade designation "RANDO WEBBER" from Rando Machine Corp. of Macedon, N.Y.; or "DAN WEB" from ScanWeb Co. of Denmark), wherein the fibers are drawn onto a wire screen or mesh belt (e.g., a metal or nylon belt). To provide individualized (i.e., separate each fiber from each other) fibers, a tow or yarn of fibers can be chopped, for example, using a glass roving cutter (commercially available, for example, under the trade designation "MODEL 90 GLASS ROVING CUTTER" from Finn & Fram, Inc., of Pacoma, Calif.), to the desired length (typically in the range from about 0.5 to about 15 cm). If a "DAN WEB"-type web-forming machine is used, the fibers are preferably individualized using a hammer mill and then a blower. To facilitate ease of handling of the mat, the mat can be formed on or placed on a scrim. Depending upon the length of the fibers, the resulting mat typically has sufficient handleability to be transferred to a needle punch machine without the need for a support (e.g., a scrim).

The nonwoven mat can also be made using conventional wet-forming or textile carding. For wet forming processes, the fiber length is preferably about 0.5 to about 6 cm.

The mounting mat is preferably a needle-punched nonwoven mat. A needle-punched nonwoven mat refers to a mat wherein there is physical entanglement of fibers provided by multiple full or partial (preferably, full) penetration of the mat, for example, by barbed needles. The nonwoven mat can be needle punched using a conventional needle punching apparatus (e.g., a needle puncher commercially available under the trade designation "DILO" from Dilo of Germany, with barbed needles (commercially available, for example, from Foster Needle Company, Inc., of Manitowoc, Wis.)) to provide a needle-punched, nonwoven mat. Needle punching, which provides entanglement of the fibers, typically involves compressing the mat and then punching and drawing barbed needles through the mat. The optimum number of needle punches per area of mat will vary depending on the particular application. Typically, the nonwoven mat is needle punched to provide about 5 to about 60 needle punches/cm². Preferably, the mat is needle punched to provide about 10 to about 20 needle punches/cm².

Alternatively the mat can be stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (e.g., stainless steel) can be used. The spacing of the stitches is usually from 3 to 30 mm so that the fibers are uniformly compressed throughout the entire area of the mat. Alternatively, the non-intumescent material layer can be purchased as, for example, Maftec™, needle-punched polycrystalline blanket from Mitsubishi Chemical company.

Non-intumescent layers made by a papermaking process useful for constructing the invention can also be purchased as, for example. Interam™ 1100, 1101, and 900 HT non-intumescent ceramic fiber mats, available from 3M Company.

The non-intumescent layers may be separately formed according to the process described above and the so obtained separate needle punched or stitchbonded layers may then be bonded to each other through needle punching or stitchbonding. However, before bonding the non-intumescent layers together, an intumescent material should be coated or sprayed on one major side of a non-intumescent layer such that upon bonding the non-intumescent layers together, an intumescent layer is sandwiched between the non-intumescent layers. Alternatively, a layer of inorganic fiber having distributed therein intumescent material may be sandwiched between non-intumescent layers and this laminate may then be needle punched or stitchbonded together. Layers of inorganic fiber having distributed therein intumescent material are commercially available from for example 3M Company as Interam™ type 100, 550, or 2000 LT. Such layers of intumescent material may be conveniently manufactured by a papermaking process. Alternatively, a web of a first non-intumescent layer may be formed and this may be coated or sprayed with an intumescent material and then a web of a second non-intumescent layer may be formed thereon. This assembly can then be needle punched or stitchbonded together. Accordingly, in the latter configuration, the various fiber layers are not separately needle punched or stitchbonded before being bonded to each other.

The present invention contemplates mounting mats having various layer constructions, each of which may be used and selected to optimize particular properties as desired. For example, in one embodiment, the mounting mat may comprise two non-intumescent layers of glass fibers, in particular magnesium aluminosilicate glass fibers, between which there is contained a layer of intumescent material. A mat of this type is generally most useful for mounting a pollution control monolith for the treatment of exhaust from a diesel engine.

In a second embodiment, the intumescent layer of the mounting mat is comprised between a non-intumescent layer of ceramic fibers formed from a sol-gel process and a non-intumescent layer of glass fibers. A mat of this type will preferably mounted in the pollution control device with the glass fiber layer facing the metal housing of the device.

In a third embodiment, the intumescent layer of the mounting mat is comprised between a non-intumescent layer of ceramic fibers formed from a sol-gel process and a non-intumescent layer of annealed ceramic fibers. A mat of this type will preferably mounted in the pollution control device with the annealed ceramic fiber layer facing the metal housing although opposite arrangements are contemplated as well, in particular when the exhaust is at relatively low temperature such as with diesel engines.

In a fourth embodiment, the intumescent layer of the mounting mat is comprised between a non-intumescent layer of glass fibers and a non-intumescent layer of annealed ceramic fibers. A mat of this type will preferably mounted in the pollution control device with the glass fiber layer facing the metal housing of the device.

In a fifth embodiment, the mounting mat may comprise two non-intumescent layers of annealed ceramic fibers, between which there is contained a layer of intumescent material.

In a sixth embodiment, the mounting mat may comprise two non-intumescent layers of fibers formed from a sol-gel process, between which there is contained a layer of intumescent material.

The invention is further described with reference to the following examples without however the intention to limit the invention thereto.

EXAMPLES

Materials Used in the Examples and Comparative Examples

A. Mats of Ceramic Fibers
CER 1 Maftec™ MLS-3 needle-bonded blanket from Mitsubishi Chemical company (72% $Al_2O_3$, 28% $SiO_2$ without binder, bulk density 0.16 g/cm$^3$)
CER 2 3M 900 HT Annealed alumino-silicate, ceramic fiber mat, weight per unit area (surface density) 1435 g/m$^2$, bulk density 0.25 g/cm$^3$, available as 900 HT from 3M Company, St. Paul, Minn./USA.

B. Glass Fiber Mat
GLASS-3M INPE 571.02, magnesium aluminium silicate glass mat, surface density 800 g/m$^2$, bulk density 0.12 g/cm$^3$, available from 3M Company, St. Paul, Minn./USA C. Intumescent Materials
INT 1 Unexpanded vermiculite, available from Cometals Inc., New York, N.Y./USA.
INT 2 3M 100 intumescent mounting mat, weight per unit area (surface density) 1050 g/m$^2$, available from 3M Company, St. Paul, Minn./USA.

Test Method—Real Condition Fixture Test (RCFT)
This test models actual conditions found in a pollution control device with a catalyst-coated monolith or diesel particulate filter during typical use, and measures the pressure exerted by the mounting material under those modelled use conditions. The RCFT method is described in detail in *Material Aspects in Automotive Pollution control devices*, ed. Hans Bode, Wiley-VCH, 2002, pp.—206-208.

Two 50.8 mm by 50.8 mm heated stainless steel platens, controlled independently, were heated to different temperatures to simulate the metal housing and monolith temperatures, respectively. Simultaneously, the space or gap between platens was increased by a value calculated from the temperature and the thermal expansion coefficients of a typical pollution control device of the type specified. High speed driving conditions for the pollution control device are simulated by a monolith temperature of up to 900° C. and a metal housing temperature of up to 530° C.

Three cycles of the RCFT were performed on each mounting mat sample. The density of the mat when mounted in the test sample is summarized in Table 2.

The pressure exerted by the mat is measured continuously as temperature of the first and second plates were first increased, held at peak temperature for 15 minutes and then reduced. The plate representing the monolith temperature is heated from room temperature to 900° C., held for 15 seconds, and returned to room temperature. Simultaneously, the plate representing the shell temperature is heated from room temperature to 530° C., held for 15 seconds, and returned to room temperature. Each of these heating cycles is referred to as one RCFT cycle. After the three RCFT cycles were run, data in Table 2 were recorded.

Pressure was recorded at room temperature at the start of the test. Peak pressure during the first cycle, and pressure at peak temperature (900° C./500° C.) for the $1^{st}$ and $3^{rd}$ cycles, respectively, were also recorded.

For an ultra-thin wall monolith, the pressure remaining after the third cycle should at least be 40 kPa to hold the monolith in place. Pressures of not more than 800 kPa should not be generated during any time in the test as such pressure risks breakage of the monolith.

Example 1

The mounting mat of Example 1 was constructed by using two layers of Maftec™, polycrystalline, MLS-3 needle-bonded blanket, surface density of 800 g/m² available from Mitsubishi Chemical company (72% $Al_2O_3$, 28% $SiO_2$ without binder, bulk density 0.16 g/cm³). A first polycrystalline mat was first sprayed on one major surface with aerosol spray adhesive (available as Foam Adhesive 74 from 3M Company, St. Paul, Minn./USA). The adhesive-coated surface was then sprinkled with unexpanded vermiculite flakes (available from Cometals, New York, N.Y./USA). The excess vermiculite was then tipped off.

The vermiculite-coated surface was then sprayed again with the adhesive and the second layer of polycrystalline mat applied. The construction was then lightly rolled with a rolling pin. The result was a sandwich construction consisting of a layer of vermiculite flakes between two layers of polycrystalline sheet material. The mat construction is summarized in Table 1.

The mounting mat of example 1 was subjected to the Real Condition Fixture Test (RCFT) described above under Test Methods. The side of the mounting mat designated as TOP LAYER in Table 1 was placed on the cooler side of the fixture (simulating the can side) in the RCFT Test equipment. The layer designated as the BOTTOM LAYER in Table 1 was located against the hotter side of the fixture (simulating the monolith) (Top layer is facing cooler side (Can side) of the monolith in all subsequent examples, as well)

Results show that sufficient force was generated to hold the monolith in place without generating so much pressure as to risk monolith breakage. RCFT values are summarized in Table 2.

Example 2

The mounting mat of Example 2 was constructed by using one layer of Maftec™ polycrystalline, MLS-3 needle-bonded blanket, surface density of 800 g/m², and one layer of 3M INPE 571.02, magnesium aluminium silicate glass mat, surface density of 800 g/m². The 3M INPE 571.02 mat was sprayed on one side with 3M 74 spray adhesive and then sprinkled with unexpanded vermiculite flakes on the adhesive-coated surface and the excess vermiculite tipped off as in Example 1.

The vermiculite-coated surface was then sprayed again and the layer of polycrystalline mat applied. The construction was then lightly rolled with a rolling pin. The result was a sandwich construction consisting of a layer of vermiculite flakes between one layers of polycrystalline ceramic sheet material and one layer of magnesium aluminium silicate material. The mat construction is summarized in Table 1.

The mounting mat of Example 2 was subjected to the Real Condition Fixture Test (RCFT) described above under Test Methods. Results show that sufficient force was generated to hold the monolith in place without generating so much pressure as to risk monolith breakage. RCFT results are summarized in Table 2.

Example 3

The mounting mat of Example 3 was constructed by using a layer of Maftec™, polycrystalline MLS-3, needle-bonded blanket, surface density of 800 g/m² and a layer of 3M 900 HT, annealed alumino-silicate, ceramic fiber mat, surface density of 1435 g/m². The polycrystalline mat was sprayed on one side with 3M 74, spray adhesive and then sprinkled with unexpanded vermiculite flakes on the adhesive-coated surface and the excess vermiculite tipped off.

The vermiculite-coated surface was then sprayed again and the layer of 3M 900 HT mat applied. The construction was then lightly rolled with a rolling pin. The result was a sandwich construction consisting of a layer of vermiculite flakes between one layer of polycrystalline ceramic sheet material and one layer of annealed, alumino-silicate material. The mat construction is summarized in Table 1.

The mounting mat of Example 3 was subjected to the Real Condition Fixture Test (RCFT) described above under Test Methods. Results show that sufficient force was generated to hold the monolith in place without generating so much pressure as to risk monolith breakage. RCFT results are summarized in Table 2.

Example 4

The mounting mat of Example 4 was constructed by using two layers of 3M 900 HT, annealed, alumino-silicate ceramic fiber mat, surface density of 1435 g/m². One layer of mat was sprayed on one side with 3M 74 spray adhesive and then sprinkled with unexpanded vermiculite flakes on the adhesive-coated surface and the excess vermiculite tipped off.

The vermiculite-coated surface was then sprayed again and the other layer of 3M 900 HT mat applied. The construction was then lightly rolled with a rolling pin. The result was a sandwich construction consisting of a layer of vermiculite flakes between two layers of annealed alumino-silicate ceramic mat. The mat construction is summarized in Table 1.

The mounting mat of Example 4 was subjected to the Real Condition Fixture Test (RCFT) described above under Test Methods. Results show that sufficient force was generated to hold the monolith in place without generating so much pressure as to risk monolith breakage. RCFT results are summarized in Table 2.

Example 5

Example 5 was prepared by placing a layer of 3M 100, intumescent mounting mat, surface density of 1050 g/m² between two layers of Maftec™ polycrystalline MLS-3 needle bonded blanket, each polycrystalline mat layer having a weight per area of surface density of 800 g/m². The mat construction is summarized in Table 1.

The mounting mat of Example 5 was subjected to the Real Condition Fixture Test (RCFT) described above under Test Methods. Results show that sufficient force was generated to hold the monolith in place without generating so much pressure as to risk monolith breakage. RCFT results are summarized in Table 2.

Example 6

Example 6 consisted of placing a layer of 3M 100, intumescent mounting mat, surface density of 1050 g/m² between a layer of Maftec™, polycrystalline MLS-3, needle-bonded blanket, surface density of 800 g/m² and a layer of 3M INPE 571.02, magnesium aluminium silicate glass mat, surface density of 800 g/m. The mat construction is summarized in Table 1.

The mounting mat of Example 6 was subjected to the Real Condition Fixture Test (RCFT) described above under Test Methods. Results show that sufficient force was generated to hold the monolith in place without generating so much pressure as to risk monolith breakage. RCFT results are summarized in Table 2.

Comparative Examples 1-2

Comparative Examples 1-2 were constructed as in Examples 3-4, respectively, but without the center layer of unexpanded vermiculite flakes. The mat constructions are summarized in Table 1.

The mounting mats of Comparative Examples 1-2, respectively, were subjected to the Real Condition Fixture Test (RCFT) described above under Test Methods. Results from the Comparative Examples 1-2 show that the holding pressure (pressure at peak temperature for cycle 3) was less than 40 kPa required to hold a monolith in place. RCFT results are summarized in Table 2.

Comparative Example 3

Comparative Example 3 consisted of 3M 100 Intumescent Mat, surface density of 4070 g/m². RCFT results show that an unacceptably high peak pressure of 1310 kPa was generated on the first cycle.

TABLE 1

Mat Constructions

| | Bottom Layer | | | Top Layer | |
|---|---|---|---|---|---|
| Example | Material | Bulk Density (g/cm³) | Center Layer | Material | Bulk Density (g/cm³) |
| 1 | CER 1 | 0.16 | INT 1 (vermiculite) | CER 1 | 0.16 |
| 2 | CER 1 | 0.16 | INT 1 (vermiculite) | GLASS | 0.12 |
| 3 | CER 1 | 0.16 | INT 1 (vermiculite) | CER 2 | 0.25 |
| 4 | CER 2 | 0.25 | INT 1 (vermiculite) | CER 2 | 0.25 |
| 5 | CER 1 | 0.16 | INT 2 (intum. mat) | CER 1 | 0.16 |
| 6 | CER 1 | 0.16 | INT 2 (intum. mat) | GLASS | 0.12 |
| C1 | CER 1 | 0.16 | — | CER 2 | 0.25 |
| C2 | CER 2 | 0.25 | — | CER 2 | 0.25 |
| C3 | — | — | INT 2 (intum. mat) | — | — |

TABLE 2

RCFT Results

| Ex. | Mat type | Mount density, (g/cm³) | Initial pressure, 23° C. (kPa) | Peak pressure for cycle 1 (kPa) | Pressure at peak temp. (900/530)* for cycle 1 (kPa) | Pressure at peak temp. (900/530)* for cycle 3 (kPa) |
|---|---|---|---|---|---|---|
| 1 | Vermiculite center layer | 0.35 | 342 | 302 | 216 | 156 |
| 2 | Vermiculite center layer | 0.40 | 637 | 637 | 246 | 177 |
| 3 | Vermiculite center layer | 0.35 | 153 | 153 | 79 | 58 |
| 4 | Vermiculite center layer | 0.45 | 175 | 175 | 71 | 47 |
| 5 | Intum. mat center layer | 0.49 | 271 | 303 | 241 | 164 |
| 6 | Intum. mat center layer | 0.49 | 330 | 376 | 199 | 135 |
| C1 | No intum. center layer | 0.35 | 115 | 115 | 35 | 30 |
| C2 | No intum. center layer | 0.45 | 168 | 168 | 30 | 25 |
| C3 | No intum. center layer | 1.0 | 240 | 1310 | 803 | 540 |

*900° C./530° C., peak temperatures of the hot side (representing monolith temperature) and cooler side (representing shell or can temperature) of the assembly, respectively, during the test Summary of Test Results As can be seen from Table 2 above, all mats of the present invention exhibit a minimum holding pressure sufficient to hold the monolith in place (greater than about 40 kPa), but do not generate excessive pressure during the simulated use cycles (greater than about 800 kPa) which are great enough to break an ultra thin-wall monolith.

The examples further show that one can obtain low cost mats comprising layers of glass or annealed ceramic fiber mat (Examples 2, 3, 4 and 6) which also meet the performance requirements for mounting of ultra thin-wall monoliths.

The invention claimed is:

1. Pollution control device comprising a pollution control element arranged in a casing with a mounting mat disposed between said casing and said pollution control element, said casing having an exterior exposed to the atmosphere, said mounting mat comprising at least one intumescent layer disposed between at least one first non-intumescent layer and at least one second non-intumescent layer, with said at least one first non-intumescent layer being disposed between said at least one intumescent layer and said pollution control element, and said at least one second non-intumescent layer being disposed between said at least one intumescent layer and said casing,
wherein (a) said at least one intumescent layer comprises an intumescent material and has a surface density of at least about 500 g/m$^2$, (b) said at least one first non-intumescent layer comprises inorganic fibers, has a surface density of at least about 450 g/m$^2$ and insulates said at least one intumescent layer from excessive heat from said pollution control element, and (c) said at least one second non-intumescent layer comprises inorganic fibers, has a surface density of at least about 450 g/m$^2$ and insulates said at least one intumescent layer from relatively lower temperatures of said casing such that said at least one intumescent layer is able to reach and sufficiently maintain its desired operating temperature so as to expand sufficiently to apply a pressure needed to maintain said pollution control element in position within said casing, with the uncompressed thickness of said intumescent layer being not more than about ⅓ of the combined uncompressed thicknesses of said first non-intumescent layer and said second non-intumescent layer, said at least one first non-intumescent layer having a compressed thickness of at least about 1 mm, and said at least one second non-intumescent layer having a compressed thickness of at least about 1 mm.

2. Pollution control device according to claim 1 wherein at least one of said first non-intumescent layer and said second non-intumescent layer comprises at least one of a layer of glass fibers, a layer of ceramic fibers obtainable from a sol-gel process, and a layer of annealed ceramic fibers.

3. Pollution control device according to claim 1 wherein the surface density of at least one of said first non-intumescent layer and said second non-intumescent layer is at least about 600 g/m$^2$.

4. Pollution control device according to claim 1 wherein the surface density of at least one of said first non-intumescent layer and said second non-intumescent layer is at least about 800 g/m$^2$.

5. Pollution control device according to claim 1 wherein the surface density of at least one of said first non-intumescent layer and said second non-intumescent layer is at least about 1000 g/m$^2$.

6. Pollution control device according to claim 1 wherein the surface density of at least one of said first non-intumescent layer and said second non-intumescent layer is at least about 1400 g/m$^2$.

7. Pollution control device according to claim 1 wherein the surface density of said intumescent layer is at least about 1000 g/m$^2$.

8. Pollution control device according to claim 1 wherein the surface density of said intumescent layer is at least about 1500 g/m$^2$.

9. Pollution control device according to claim 1 wherein the surface density of said intumescent layer is at least about 2000 g/m$^2$.

10. Pollution control device according to claim 1 wherein the uncompressed thickness of each of said intumescent layer, said first non-intumescent layer and said second non-intumescent layer is in the range of from about 0.1 mm to about 10 mm.

11. Pollution control device according to claim 10 wherein the uncompressed thickness of said mounting mat is in the range of from about 3.0 mm to about 30 mm.

12. Pollution control device according to claim 1 wherein the uncompressed thickness of said intumescent layer is the same or thinner than the combined uncompressed thickness of said first non-intumescent layer and said second non-intumescent layer.

13. Pollution control device according to claim 1 wherein said mounting mat has a bulk density of 0.15 g/cm$^3$ to 0.50 g/cm$^3$.

14. Pollution control device according to claim 1 wherein said intumescent layer further comprises inorganic fibers.

15. Pollution control device according to claim 1 wherein at least one of said non-intumescent layers comprises inorganic fibers that are essentially shot free.

16. Pollution control device according to claim 1 wherein said at least one first non-intumescent layer, said at least one second non-intumescent layer, or said mounting mat comprises a needle-punched structure.

17. Pollution control device according to claim 1 wherein the pollution control element comprises a pollution control monolith having a wall thickness of not more than 0.127 mm and from 62 to 186 cells per square centimeter.

18. Pollution control device according to claim 1 wherein said second non-intumescent layer is not bonded to said intumescent layer, before said mounting mat is disposed between said casing and said pollution control element.

* * * * *

UNITED STATES PATENT AND TRADEMARK OFFICE
CERTIFICATE OF CORRECTION

PATENT NO.         : 9,494,071 B2                                   Page 1 of 1
APPLICATION NO.    : 10/561290
DATED              : November 15, 2016
INVENTOR(S)        : Merry

It is certified that error appears in the above-identified patent and that said Letters Patent is hereby corrected as shown below:

In the Specification

Column 9, Line 42, delete "34" and insert -- 3-4 --.

Column 15, Line 14, delete "g/m." and insert -- $g/m^2$. --.

Signed and Sealed this
Twenty-eighth Day of March, 2017

Michelle K. Lee
*Director of the United States Patent and Trademark Office*